United States Patent [19]

Fernhout

[11] Patent Number: 5,334,986
[45] Date of Patent: Aug. 2, 1994

[54] DEVICE FOR DETERMINING THE POSITION OF A VEHICLE

[75] Inventor: Herman C. Fernhout, 's-Hertogenbosch, Netherlands

[73] Assignee: U.S. Philips Corporation, New York, N.Y.

[21] Appl. No.: 38,432

[22] Filed: Mar. 29, 1993

[30] Foreign Application Priority Data

Apr. 9, 1992 [DE] Fed. Rep. of Germany ....... 4211933

[51] Int. Cl.$^5$ ............................................. G01S 5/02
[52] U.S. Cl. ..................................... 342/357; 342/459
[58] Field of Search ................................ 342/357, 457

[56] References Cited

U.S. PATENT DOCUMENTS

| | | | |
|---|---|---|---|
| 4,459,667 | 7/1984 | Takeuchi | 342/457 |
| 4,912,645 | 3/1990 | Kakihara et al. | 342/357 X |
| 5,075,693 | 12/1991 | McMillan et al. | 342/457 |
| 5,087,919 | 2/1992 | Odagawa et al. | 342/357 |
| 5,089,826 | 2/1992 | Yano et al. | 342/457 |
| 5,220,509 | 6/1993 | Takemura et al. | 342/357 X |

*Primary Examiner*—Mark Hellner
*Attorney, Agent, or Firm*—Robert J. Kraus

[57] ABSTRACT

A device for determining the position of a vehicle comprises a GPS (Global Positioning System) receiver (6) which supplies vehicle position data at regular intervals on the basis of data received from satellites, a device (1) for dead-reckoning on the basis of the position data from the GPS receiver (6), a compass (2) and at least one wheel sensor (3), and a correction unit (4) which corrects the dead-reckoning values supplied at regular intervals by the dead-reckoning device (1) in dependence on comparison with road position coordinates read from a mass memory (5), notably with characteristic road position coordinates, and outputs the corrected values as vehicle position coordinates. For autonomous correction of the data from the GPS receiver the vehicle position coordinates supplied by the correction unit (4) are applied to the GPS receiver (6), the position data derived from the satellite reception in the GPS receiver (6) being corrected in conformity with the vehicle position coordinates supplied by the correction unit (4) and being applied in corrected form to the dead-reckoning device (1) as position data.

8 Claims, 1 Drawing Sheet

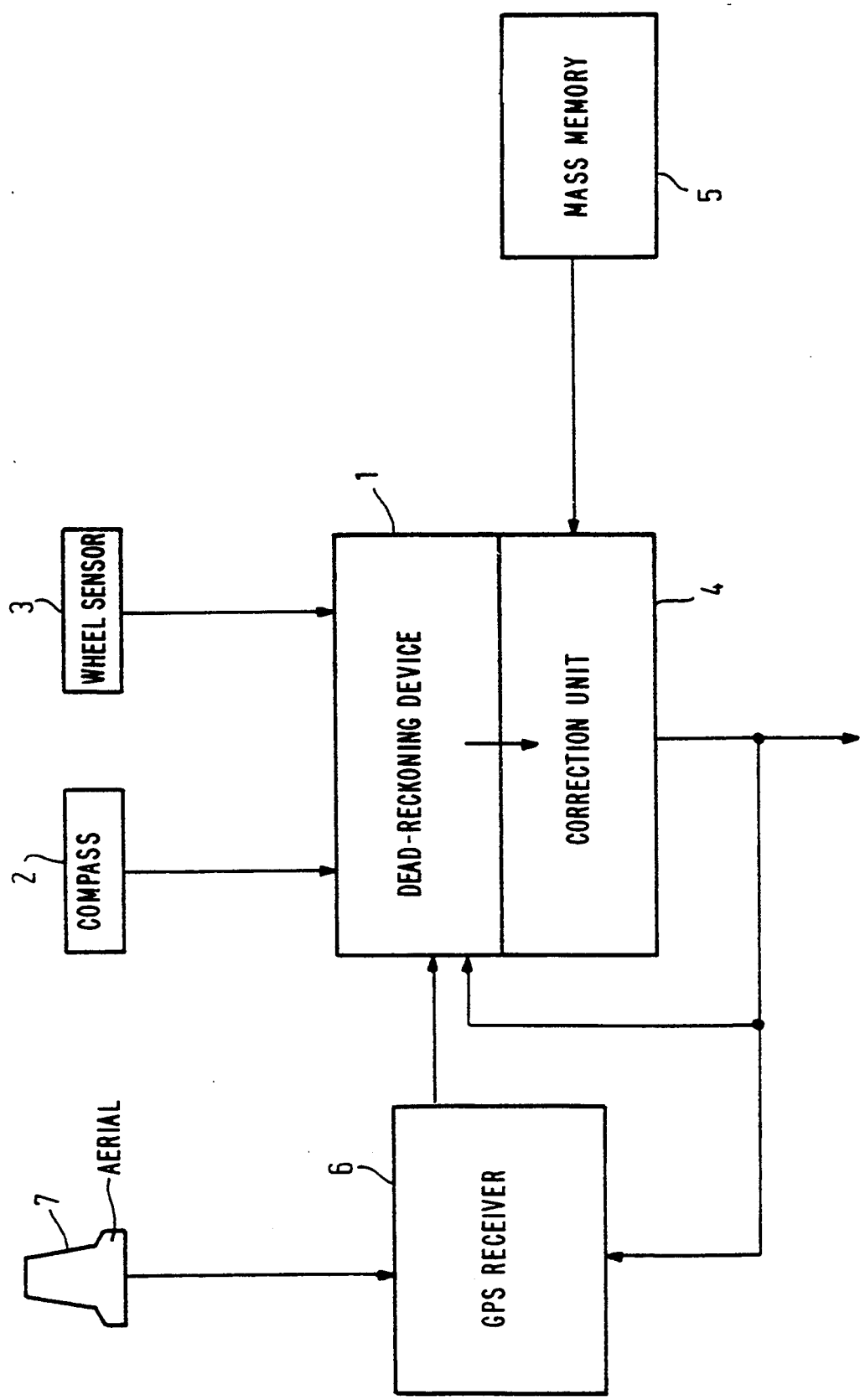

DEVICE FOR DETERMINING THE POSITION OF A VEHICLE

BACKGROUND OF THE INVENTION

The invention relates to a device for determining the position of a vehicle, comprising a GPS (Global Positioning System) receiver which supplies at regular intervals position data of the vehicle on the basis of data received from satellites, and also comprising a device for performing dead-reckoning on the basis of the position data from the GPS receiver, a compass and at least one wheel sensor, and a correction unit which corrects the dead-reckoning values, supplied at regular intervals by the dead-reckoning device, in dependence on comparisons with road or rail position coordinates read from a mass memory, notably with characteristic road or rail position coordinates, which correction unit outputs said corrected values as vehicle position coordinates.

In known devices of this kind, the current vehicle position is continuously determined by dead-reckoning, utilizing notably a compass and one or more wheel sensors. The errors then occurring can be corrected by comparison with road position coordinates read from a mass memory (map matching). Notably characteristic road position coordinates, for example curves in roads or intersections, can be readily recognized and the vehicle position determined by dead-reckoning can be corrected in conformity with the coordinates of the known, characteristic points.

This combination of dead-reckoning and correction by road position coordinates fails when the vehicle is started or, generally speaking, when the road position coordinates are unknown like after transport of the vehicle by rail or ship or the like. To this end, in known devices there is provided a GPS receiver which receives signals from GPS satellites and which is capable of calculating the position of the GPS receiver or the vehicle on the basis of the reception of said signals, notably on the basis of the phase shifts of these signals relative to one another. However, the accuracy of such position determination by means of a GPS receiver amounts to only a few hundred meters; this is inadequate, for example for accurate determination of the position of a vehicle in a city.

In known devices of this kind, the correction of the position data supplied by the GPS receiver is performed by means of a data channel. Via this data channel, the GPS receiver is informed from outside about the continuously varying magnitude and direction of the error, via an additional infrastructure to be provided.

SUMMARY OF THE INVENTION

It is an object of the invention to provide a device which performs the correction of the position data of the GPS receiver as simply as possible.

This object is achieved in accordance with the invention in that the vehicle position coordinates supplied by the correction unit are applied to the GPS receiver, the position data derived from the satellite reception being corrected in the GPS receiver in conformity with the vehicle position coordinates supplied by the correction unit, the corrected data being applied to the dead-reckoning as position data.

The vehicle position coordinates which are supplied by the correction unit and which continuously represent the current vehicle position are thus also used to correct the position data in the GPS receiver. This is possible because the vehicle position coordinates which have been compared with the road position coordinates read from the mass memory and which have been corrected accordingly are very accurate. In any case the error in the position data of the GPS receiver is greater and varies only very slowly in time. Therefore, the correction by means of the vehicle position coordinates can be performed at adequate time intervals. The GPS receiver subsequently supplies quite accurate position data, so that the correction subsequently taking place in the correction unit can be smaller. In this quasi fed back state of the system, the GPS data will ultimately be so accurate that they quite accurately indicate the current position.

According to this solution for correcting the data of the GPS receiver, notably an external data channel requiring an additional third-party infrastructure can be dispensed with. Furthermore, the separation in space between an external data source and the GPS receiver in the vehicle is eliminated, so that additional errors inherent of such separation are avoided. This also eliminates the errors caused by the limited transmission speed in the case of spatial separation. The data of the GPS receiver can be very accurately corrected. Because the the dead-reckoning device as well as the correction unit are already included in most devices for determining the position of a vehicle, the additional expenditure for the correction of the data of the GPS receiver is extremely small.

In further embodiments of the invention, the correction unit determines a new internal correction value each time when a new characteristic point occurs in the road position coordinates, the data subsequently supplied by the dead-reckoning device being corrected in dependence on the new internal correction value which remains valid until the next characteristic point in the road position coordinates for which a new internal correction value is determined is reached.

The correction in the correction unit of the dead-reckoning values supplied at regular intervals by the dead-reckoning device can take place notably on the basis of characteristic road points and the associated road position coordinates stored in the mass memory. Characteristic points of this kind occur at irregular distances in time, so that correction is not always possible between these points. However, on the basis of these characteristic points a correction can be very accurately performed, so that this correction at irregular distances in time is adequate. Thus, at each new characteristic point in the road position coordinates a new internal correction value is formed in the correction unit, which new internal correction value remains valid until a new correction value is formed at a next characteristic point. The position data of the GPS receiver is also corrected in conformity with this internal correction value and the vehicle position coordinates subsequently supplied by the correction unit. The accuracy of this correction is adequate, because the error in the position data of the GPS receiver changes only very slowly and, generally speaking, it can be assumed that it remains approximately the same between two characteristic points in the road position coordinates.

In a further embodiment of the invention, for the mass memory, use is attractively made of an interactive ROM system, such as the Compact Disc Interactive unit available from Philips Electronics, which combines a high storage density with a short access time and which is presumably capable of storing a large part of the necessary road position coordinates of a country the size of Germany.

BRIEF DESCRIPTION OF THE DRAWING

An embodiment of the invention will be described in detail hereinafter with reference to the sole FIGURE.

The FIGURE shows a block diagram of a device in accordance with the invention for determining the position of a vehicle.

DESCRIPTION OF THE PREFERRED EMBODIMENT

The device for determining the position of a vehicle comprises a dead-reckoning device 1. A compass 2 and at least one wheel sensor 3 are associated with the device 1. Downstream from the device 1 there is provided a correction unit 4 with which there is associated a in mass memory 5 which may be, for example a Compact Disc Interactive unit.

There is also provided a GPS receiver 6 which is capable of determining, on the basis of the data received from several satellites, a position of a vehicle in which the device shown in FIG. 1 can be incorporated. For the reception of signals from these satellites there is provided a satellite receiving aerial which is denoted by the reference numeral 7 in the FIGURE.

The GPS receiver 6 continuously applies vehicle position data to the dead-reckoning device 1. Furthermore, this device receives the direction of travel, or the direction in which the vehicle is oriented, via the compass 2. Via the wheel sensor 3, the device 1 can determine the displacement and short term change of direction of travel in the corresponding direction. On the basis of this data, dead-reckoning can be performed in known manner so that new position data is determined continuously. This data is applied to the correction unit 4 which compares this data with road position coordinates read from the mass memory 5. At characteristic road points, for example at curves or intersections, the instantaneous position can be reliably recognized on the basis of the road position coordinates. In the correction unit a corresponding correction value is then formed and the data supplied by the device 1 is corrected in dependence on this correction value. The correction unit 4 then supplies the corrected vehicle position coordinates. These continuously renewed coordinates indicate the vehicle position.

This output signal, made available for further processing, is applied to the device 1 as well as to the GPS receiver 6.

The position data determined by the GPS receiver 6 on the basis of satellite reception is known to exhibit an error of from approximately 100 to 200 meters (known to the operator of the GPS system). On the basis of the vehicle position coordinates, supplied by the correction unit 4 and being quite correct due to the comparison with the road position coordinates read from the mass memory 5, the position data is corrected in the GPS receiver 6. The GPS receiver 6 then outputs already corrected position data.

Subsequently, on the basis of the corrected position data supplied by the GPS receiver or the vehicle position coordinates supplied by the correction unit 4, quite accurate dead-reckoning can be performed in the device 1.

The accuracy of the device shown in the FIGURE for determining the position of a vehicle is, therefore, quite high. The accuracy during displacement of the vehicle is achieved by the combination of dead-reckoning and the comparison of the road position coordinates from the mass memory and the continuous correction of the GPS data. By correction of the data of the GPS receiver quite accurate determination of the position of the vehicle in which the device is incorporated can also take place after transport of the vehicle, or upon starting of the vehicle in an unknown location.

I claim:

1. A device for determining the position of a vehicle, comprising:
   a. a Global Positioning System receiver for periodically providing GPS position data determined from data received from a plurality of satellites;
   b. sensor means attached to the vehicle for providing sensor data representative of the navagational direction and wheel movement of the vehicle;
   c. dead-reckoning means for providing dead-reckoning position data determined from the GPS position data and from sensor data;
   d. memory means for storing route data for a geographic region to be navigated by the vehicle;
   d. correction means for comparing the dead-reckoning position data with substantially corresponding route data from the memory means and for correcting the dead-reckoning position data to produce corrected vehicle position coordinates; and
   e. means for correcting the GPS position data provided by the receiver in correspondence with the corrected vehicle position coordinates.

2. A device as in claim 1 where the correction means recognizes predetermined characteristic route points and determines respective correction values for affecting correction of the dead-reckoning position data.

3. A device as in claim 2 where the correction value determined upon recognition of a one of said predetermined characteristic route points remains valid until a subsequent one of said points is recognized.

4. A device as in claim 1, 2 or 3 where the memory means comprises an interactive CD ROM.

5. A method for determining the position of a vehicle, comprising:
   a. periodically providing GPS position data determined from data received from a plurality of satellites;
   b. providing sensor data representative of the navagational direction and wheel movement of the vehicle;
   c. providing dead-reckoning position data determined from the GPS position data and from the sensor data;
   d. storing in memory means route data for a geographic region to be navigated by the vehicle;
   d. comparing the dead-reckoning position data with substantially corresponding route data from the memory means and correcting the dead-reckoning position data to produce corrected vehicle position coordinates; and
   e. correcting the GPS position data in correspondence with the corrected vehicle position coordinates.

6. A method as in claim 5 where the comparison includes recognizing predetermined characteristic route points and determining respective correction values for affecting correction of the dead-reckoning position data.

7. A method as in claim 6 where the correction value determined upon recognition of a one of said predetermined characteristic route points remains valid until a subsequent one of said points is recognized.

8. A device as in claim 5, 6 or 7 where the memory means comprises an interactive CD ROM.

* * * * *